United States Patent [19]

Beever et al.

[11] Patent Number: 5,699,356
[45] Date of Patent: Dec. 16, 1997

[54] SYSTEM AND METHOD FOR PERSONAL COMMUNICATION SYSTEM DYNAMIC CHANNEL ALLOCATION

[75] Inventors: Ernest A. Beever; Walter Evanyk, both of Plano; Henry A. Thomas, Carrollton, all of Tex.

[73] Assignee: MCI Communication, Washington, D.C.

[21] Appl. No.: 503,056

[22] Filed: Jul. 17, 1995

[51] Int. Cl.$^6$ ........................................... H04J 3/16
[52] U.S. Cl. ..................... 370/329; 370/404; 370/468
[58] Field of Search ................... 370/85.7, 95.1, 370/95.3, 84, 85.12, 85.15, 94.3, 80, 81, 328, 338, 347, 348, 329, 442, 443, 468, 404; 379/59, 60; 455/33.1, 34.1, 54.1, 54.2, 56.1; 340/825.05

[56] References Cited

U.S. PATENT DOCUMENTS

| | | | |
|---|---|---|---|
| 4,718,061 | 1/1988 | Turner | 370/85.7 |
| 4,763,325 | 8/1988 | Wolfe et al. | 370/95.3 |
| 4,792,946 | 12/1988 | Mayo | 370/86 |
| 4,799,237 | 1/1989 | Itoh | 340/825.01 |
| 4,858,232 | 8/1989 | Diaz et al. | 370/85.7 |
| 4,879,714 | 11/1989 | Maeno | 370/85.7 |
| 4,949,395 | 8/1990 | Rydbeck | 370/95.3 |
| 5,040,177 | 8/1991 | Martin et al. | 370/110.1 |
| 5,111,454 | 5/1992 | Hung et al. | 370/95.3 |
| 5,130,982 | 7/1992 | Ash et al. | 370/85.7 |
| 5,159,592 | 10/1992 | Perkins | 370/85.7 |
| 5,224,099 | 6/1993 | Corbalis et al. | 370/94.2 |
| 5,280,482 | 1/1994 | Kitamura et al. | 370/85.7 |
| 5,299,198 | 3/1994 | Kay et al. | 370/95.3 |
| 5,303,287 | 4/1994 | Laborde | 370/95.3 |
| 5,313,461 | 5/1994 | Ahl et al. | 370/94.2 |
| 5,323,383 | 6/1994 | Satoh | 370/85.7 |
| 5,341,364 | 8/1994 | Marra et al. | 370/16.1 |
| 5,349,580 | 9/1994 | Hester et al. | 370/95.1 |
| 5,430,724 | 7/1995 | Fall et al. | 370/95.3 |

OTHER PUBLICATIONS

R.C.V. Macario, "Cellular Radio Principles and Design", McGraw–Hill, 1993, ISBN 0–07–044301–7, pp. 182–183.
Minoli, "Telecommunications Technology Handbook" (1991) [pp.104–111 and 298–305].

*Primary Examiner*—Benedict V. Safourek
*Assistant Examiner*—Chau T. Nguyen

[57] ABSTRACT

A personal communication network distribution system includes a predetermined number of node devices, a controller, and a network connecting the controller to each of the node devices. The network carries a time division multiplexed signal having a plurality of channels for carrying digital communication information signals between the controller and the respective node devices. Each respective node device is assigned a respective predetermined number of the plurality of channels for receiving digital communication information signals from and/or for inserting digital communication information signals into the time division multiplexed signal. The time division multiplexed signal also includes a second predetermined number of non-assigned channels. The controller assigns one of the non-assigned channels of the time division multiplexed signal to one of the node devices for receiving and/or for inserting communication information signals into the time division multiplexed signal based on call activity at the one node device.

10 Claims, 6 Drawing Sheets

SYSTEM AND METHOD FOR PERSONAL COMMUNICATION SYSTEM DYNAMIC CHANNEL ALLOCATION

BACKGROUND OF THE INVENTION

1. Field of the Invention

The present invention relates to a personal communication network (PCN). More particularly, the present invention relates to a personal communication network distribution system and a method for distributing signals on a personal communication network.

2. Description of the Related Art

Presently in mobile communications systems, the technique of time division multiplexing (TDM) is used for sending communication information signals between a base station controller (BSC) and base transceiver stations (BTSs). The approach has been to permanently assign specific channels to specific BTSs for communicating the information signals between the BSC and BTSs. However this approach limits or restricts distribution of traffic loading, possibly causing traffic overload conditions for one or more BTSs.

U.S. Pat. No. 5,303,287 to Laborte discloses a wireless communication system that provides dynamic channel allocation for moving communication channels between microcells of a PCN for handling high traffic variability. A PCN hub of this system includes a base station controller connected to a plurality of centralized channel units. The channel units output six frequency division multiplex (FDM) signals spanning a bandwidth of approximately 300 MHz with each channel covering a 25 MHz bandwidth. The channel units are connected through a PCN distribution network to a plurality of radio ports arranged to form microcells. According to Laborte, dynamic channel allocation can be done by dynamic time and/or frequency allocation on the FDM signals output by the channel units. With dynamic time allocation, a channel unit assigns time slots on a FDM carrier signal to any particular microcell without changing frequencies.

U.S. Pat. No. 5,299,198 to Kay et al. discloses a mobile telephone system that multiplexes a plurality of voice traffic channels on a single carrier using a time division protocol. Each base station controller manages a digital speech interpolation (DSI) pool of duplex transmission channels. Each DSI pool consists of a plurality of different carrier frequencies, each of which are time divided for providing a repeating frame consisting of a number of slots. Since a large portion of any telephone conversation is an inactive period, the Kay et al. system assigns radio transmission capacity to a mobile station only when a voice signal is available for transmission to or from that mobile station.

While these systems provide techniques for handling high traffic variability or for increasing system transmission capacity, these systems do not allow for making the entire system capacity available to a BTS for handling traffic.

SUMMARY OF THE INVENTION

The present invention addresses this traffic loading problem by making all of a circuit's capacity available to every base transceiver station on an individual basis. Techniques for exploiting the silent intervals in voice conversations, such as Time Assigned Speech Interpolation (TASI) or Digital Speech Interpolation (DSI), can be used for further improving the capability of the present invention for avoiding traffic loading problems.

The present invention provides a personal communication network distribution system having dynamic channel assignment and which includes a predetermined number of node devices, a controller, and a network connecting the controller to each of the node devices. The network carries a TDM signal between the controller and the respective node devices. According to the invention, the TDM signal includes a plurality of channels for carrying digital communication information signals, with each respective node device being assigned a respective predetermined number of the plurality of channels for receiving digital communication information signals from the TDM signal and/or for inserting digital communication information signals into the TDM signal. The TDM signal also includes a second predetermined number of non-assigned channels. In operation, the controller assigns one of the non-assigned channels to one of the node devices for receiving and/or for inserting communication information signals into the TDM signal based on call activity at the one node device and/or based on the time of day. The controller can also assign the one non-assigned channel of the time division multiplexed signal to the one node further based on a digital speech interpolation (DSI) technique and/or a weighted combination of a DSI technique, call activity and the time of day. In one embodiment of the present invention, the network is configured as a wired ring network with a first ring circuit for carrying communication information signals in a first direction, and a second ring circuit for carrying communication information signals in a second opposite direction. In another embodiment of the present invention, the network is configured as a star network. The node devices in either embodiment can be T-1 facilities, HDSL devices, split-T facilities, routers, servers, private networks, V.35 interface devices, RS-449 serial interface devices, workstations or ports capable of accepting a T-1 communication stream.

The present invention also provides a method for distributing communication signals on a personal communication network distribution system which includes the steps of defining a second predetermined number of the channels of the time division multiplexed signal to be non-assigned channels with the second predetermined number being less than or equal to the first predetermined number, and assigning one of the non-assigned channels of the time division multiplexed signal to one of the node devices for receiving and/or inserting digital communication information signals into the time division multiplexed signal based on call activity at the one node device. According to the invention, the step of assigning one of the non-assigned channels of the time division multiplexed signal to the one of the node devices can be further based on a digital speech interpolation technique, a time of day, or a weighted combination of call activity and the time of day.

BRIEF DESCRIPTION OF THE DRAWINGS

The present invention is illustrated by way of example and not limitation in the accompanying figures in which like reference numerals indicate similar elements and in which.

DETAILED DESCRIPTION OF THE PREFERRED EMBODIMENTS

Figure 1:
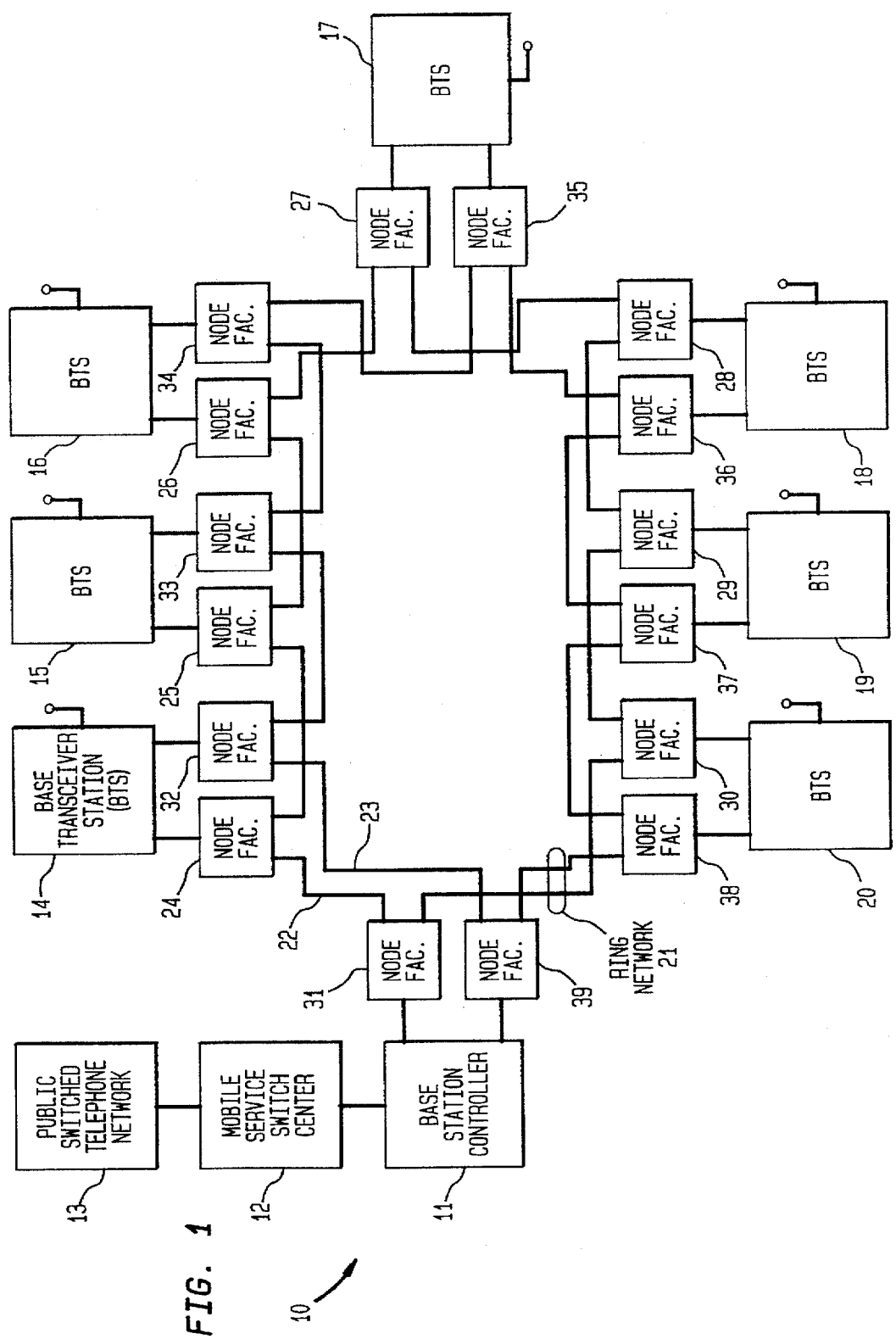
FIG. 1 is a generalized schematic block diagram of a wired ring network system for a personal communication network having dynamic channel assignment capability according to the present invention.

FIG. 1 illustrates a generalized schematic block diagram of an exemplary wired ring network system 10 for a personal communication network having dynamic channel assignment capability according to the present invention.

System 10 includes a base station controller (BSC) 11 connected to a mobile services switching center (MSC) 12, which in turn is connected to a public switched telephone network (PSTN) 13. In the example of FIG. 1, mobile services switching center 12 typically provides GSM (Global Service for Mobile Communication) service to base station controller 11. That is, the link between BSC 11 and MSC 12 conforms to the GSM standard for mobile communications. It should be noted, though, that the link between BSC 11 and MSC 12 is not limited to the GSM, but can conform to other known standards such as Advanced Analog Mobile Phone System (AMPS) or AMPS-D which sets for the standards for adapting the AMPS system to a dual mode operating environment in which a digital cellular network co-exists with the analog service.

Base station controller 11 is connected to base transceiver stations (BTSs) 14–20 by ring network 21. Base transceiver stations 14–20 communicate with personal communication system (PCS) devices (not shown) over a radio link (not shown) in a well-known manner. Ring network 21 includes a first ring circuit 22 for routing communication information signals (voice and control signals) between BSC 11 and the BTSs in a clockwise direction around the ring, and a second ring circuit 23 for routing communication information signals in a counter-clockwise direction. Ring circuits 22 and 23 of ring network 21 are digital hard-wired communication links between each of BTSs 14–20 and BSC 11.

Preferably, base station controller 11 is connected to ring circuit 22 by node facility (NF) 31 and to ring circuit 23 by node facility 39. Both node facilities 31 and 39 are independent facilities, that is, they operate independently from each other. Each BTS is respectively connected to each ring circuit of ring network 21 through an independent node facility. As shown, BTSs 14–20 are connected to ring circuit 22 by node facilities 24–30, respectively. Similarly, BTSs 14–20 are connected to ring circuit 23 by node facilities 32–38, respectively. In the preferred embodiment of the invention, node facilities 24–39 are each embodied as a standard T-1 facility, but can also be HDSL (High bit rate Digital Subscriber Line) devices, or any other similar device providing drop/insert (D&I) and repeat functional capability on a T-1 frame-by-frame basis, such as a split-T facility available from Larscom of Santa Clara, Calif. Other possibilities for node facilities are appropriately configured routers, servers, private networks, V.35 interface devices, RS-449 serial interface devices, workstations and ports capable of accepting a T-1 data stream.

The ring configuration of network 21 aids restoral and provides increased reliability over that of a star-type network arrangement because communication information signals between BSC 11 and each of the respective BTSs can be routed through either ring circuit 22 or ring circuit 23. So, if a link between any of the BTSs of a particular ring circuit fails, then communication traffic can be routed through the non-failed ring circuit. For example, if the communication link between BTS 15 and BTS 16 of ring circuit 22 fails, then all communication traffic which had originally been routed through ring circuit 22 is then routed through ring circuit 23 by BSC 11. Additional reliability can be achieved by providing diversive cable routing for each ring circuit at each node facility.

Each node facility 24–39 includes drop/insert and repeat capabilities on a T-1 frame-by-frame basis. That is, communication information signals directed downstream from the BSC to a particular destination BTS will be directed, or dropped, from the communication information signal stream at the destination BTS by the node facility connected to the destination BTS. Communication information signals sent from a particular BTS upstream to the BSC will be inserted into the communication information signal stream by the node facility connected to the sending BTS. Communication information signals arriving at a node facility will be repeated, or passed through, if the communication information signals are intended for a BTS other than the BTS connected to that node facility. Signalling can be in-band or out-of-band.

In the preferred embodiment of the invention, BTSs 14–20 are configured as standard T-1 facilities. Consequently, there are 24 available 64-Kbyte channels in a standard T-1 frame for communicating information between the BSC and the BTSs. Preferably, each of the seven BTSs shown in FIG. 1 is assigned 3 channels. The 3 remaining unassigned channels are floating channels that are allocated between the BTSs in a dynamic manner by BSC 11 for alleviating traffic load problems. All 24 channels can also be configured to be available to all of the BTSs of the system.

Figure 2:
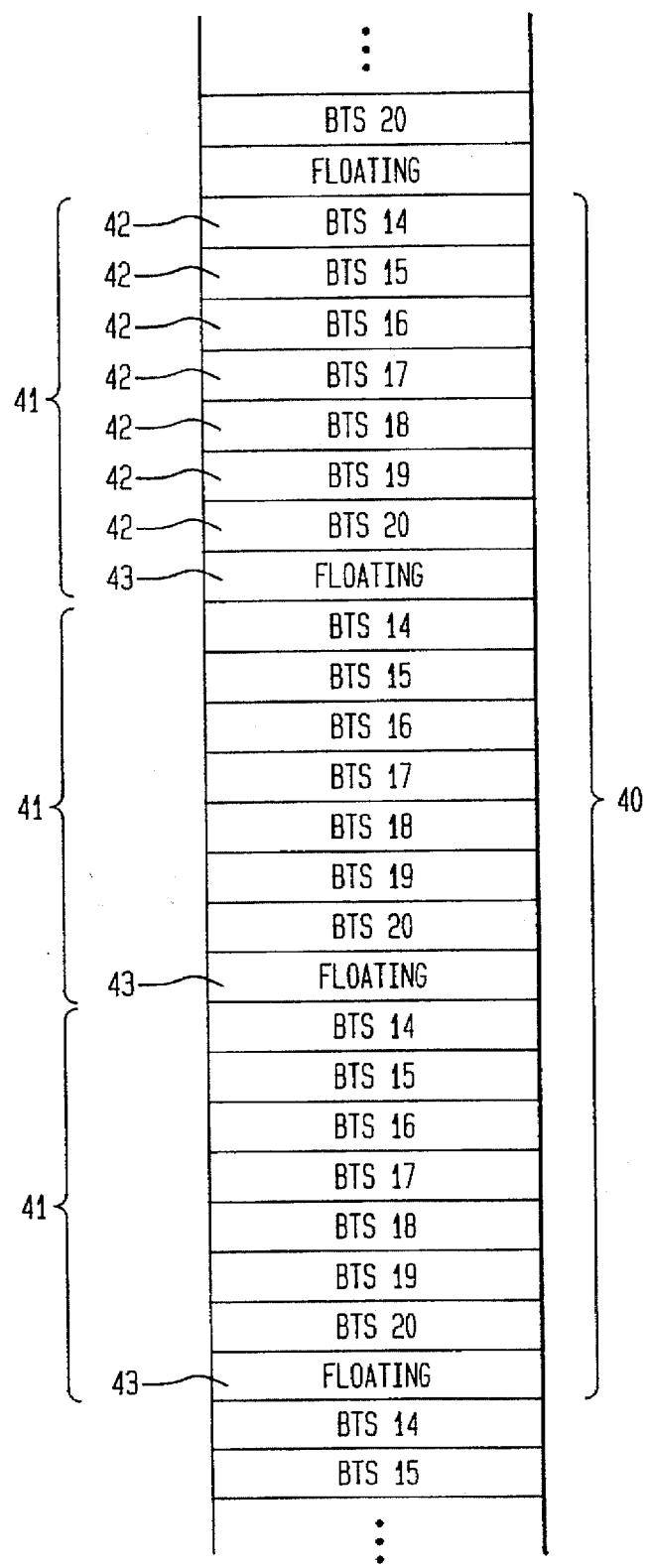
FIG. 2 depicts an assignment of channels for communication information signals according to the present invention.

FIG. 2 shows a standard T-1 time frame 40 with 24 channels. Twenty-one of the 24 channels have been assigned to BTSs 14–20 in an exemplary manner. Three of the channels have been allocated as floating channels. The order of assignment of the 24 channels among BTSs 14–20 can be any convenient order facilitating efficient call activity management. As shown in FIG. 2, the channels, or time slots, of frame 40 are arranged in three groups 41 of 8 channels each. The first seven channels 42 of each group 41 are consecutively assigned to BTSs 14–20, respectively, with the eighth channel allocated as a floating channel 43. The channels shown in FIG. 2 can also be allocated on a frame-by-frame basis so that digital speech interpolation (DSI) techniques can be used for increasing capacity of the system by exploiting silent intervals in voice conversations.

If call activity at a given BTS is such that the three channels assigned to that BTS are filled to capacity and additional service is needed at the BTS, the BTS requests an additional channel from BSC 11 for handling the increased traffic. The request is communicated to BSC 11 in a well-known manner, such as using the BTS RACCH (Random Access Control Channel). Base station controller 11 responds to the request by assigning one of the available floating channels to the requesting BTS. The channel assignment is communicated back to the requesting BTS so that the BTS can handle the increased call activity.

Base station controller 11 continues to monitor the traffic load of the BTS so that the assigned floating channel can be returned to floating channel status for subsequent reassignment among the respective BTSs as required. All necessary GSM interface protocols between MSC 12 and the BTSs are handled by BSC 11 so that the dynamic channel assignment is transparent to MSC 12. It should be apparent that the number of BTSs associated with a particular BSC and/or the assignment of channels to the BTSs should allow for floating channels according to the present invention.

As mentioned, digital speech interpolation (DSI) or time assigned speech interpolation (TASI) techniques can be used as a basis for dynamic channel allocation according to the present invention. That is, during silent periods of voice conversations channels are assigned floating channel status making them available to be dynamically allocated as needed.

As an alternative to dynamic channel assignment based on call activity, dynamic channel assignment can be based on a time of day (TOD). That is, if it is known that call activity for certain BTSs increases during particular time periods of the day, then floating channels can be assigned to these BTSs for handling increased call activity during those time periods. For example, if several BTSs are located along a highway and call activity normally increases during the morning and evening rush hours, the floating channels can be assigned to the BTSs located along the highway during the rush hours. As a further alternative, dynamic channel assignment can be based on a weighted combination of call activity and a time of day.

As another variation of the preferred embodiment of the present invention, the 24 channels can be allocated between BTSs 14–20 in a manner other than the described 3 channels per BTS. For example, BTSs 14–16 can initially be assigned 4 channels each, while BTSs 17–20 are each assigned 2 channels each. This leaves 2 floating channels which can be dynamically assigned by BSC 11. Another example would be to assign 2 channels to each of the seven BTSs leaving 10 floating channels for dynamic assignment.

Yet another example would be to have all 24 channels be floating channels and have the BSC assign the channels based on call traffic and/or time of day principles. This approach would provide an increased level of security over a system in which all channels are permanently assigned because the dynamic channel assignment of the present invention would assign channels on a random basis. Thus, the location of any particular call within the TDM signal frame would not be predictable.

Figure 3:
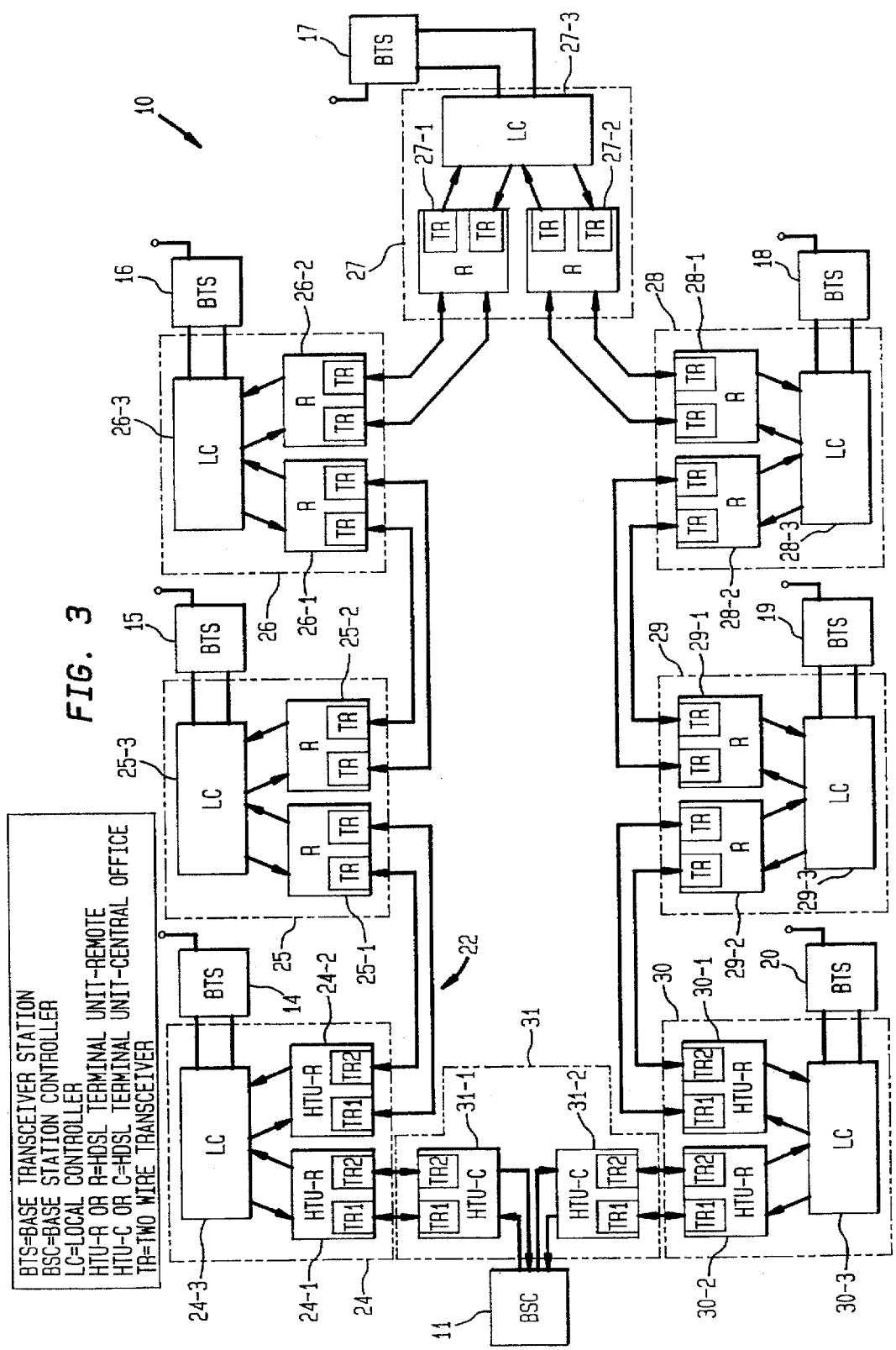
FIG. 3 is a detailed schematic block diagram of one ring circuit of a ring network system according to the present invention.

FIG. 3 shows ring circuit 22 of ring network system 10 of FIG. 1 in greater detail. Ring circuit 23 has been omitted in FIG. 3 for clarity in showing ring circuit 22. Even though not shown, ring circuit 23 is configured like ring circuit 22. In FIG. 3, BTS 11 is connected to ring circuit 22 through node facilities 31-1 and 31-2, which are both shown as HDSL Terminal Units at the Central Office, hence the designation HTU-C. The TR-1 and TR-2 designations appearing within the node facilities of FIG. 3 indicates that the node facilities are 2 wire transceivers which simultaneously transmit and receive on a pair of wires. A suitable HDSL device terminating wire pair facility for node facilities 31-1 and 31-2 is manufactured by Pairgain of Cerritos, Calif. Node facilities 31-1 and 31-2 could also be embodied as standard T-1 facilities, or as split-T facilities.

Base transceiver station 14 is connected to ring circuit 22 through node facility 24, which includes HDSL Terminal Unit-Remote (HTU-R) 24-1 and 24-2, and local controller 24-3. Local controller 24-3 provides dynamic drop and insert capability for communication information signals transmitted through ring circuit 22. That is, local controller 24-3 controls the dropping of communication information signals from the signal stream carried by ring circuit 22 directed to BTS 14 and controls insertion communication information signals into the signal stream of ring circuit 22. Local controller 24-3 also responds to control signals from BTS 11 for controlling the dropping and insertion of communication information signals into floating channel which has been dynamically assigned to BTS 14.

Base transceiver stations 15–20 are each connected to ring circuit 22 through node facilities 25–30, respectively. Each node facility 25–30 is configured similarly to node facility 24 in that each facility 25–30 includes two HTU-R devices and a local controller. In FIG. 3, the HTU-R devices of facilities 25–30 are indicated merely with an R designation for simplicity. The HTU-R devices and the local controller of each node facility 25–30 operates in the same manner as the HTU-R devices and the local controller of node facility 24. The repeating functionality of each node facility allows for different channel slot assignments between the respective node facilities. For example, channel slot 1 can be dynamically assigned between node facilities 24 and 25 for a particular communication signal, and channel slot 16 can be dynamically assigned for the same communication signal between node facilities 25 and 26.

Figure 4:
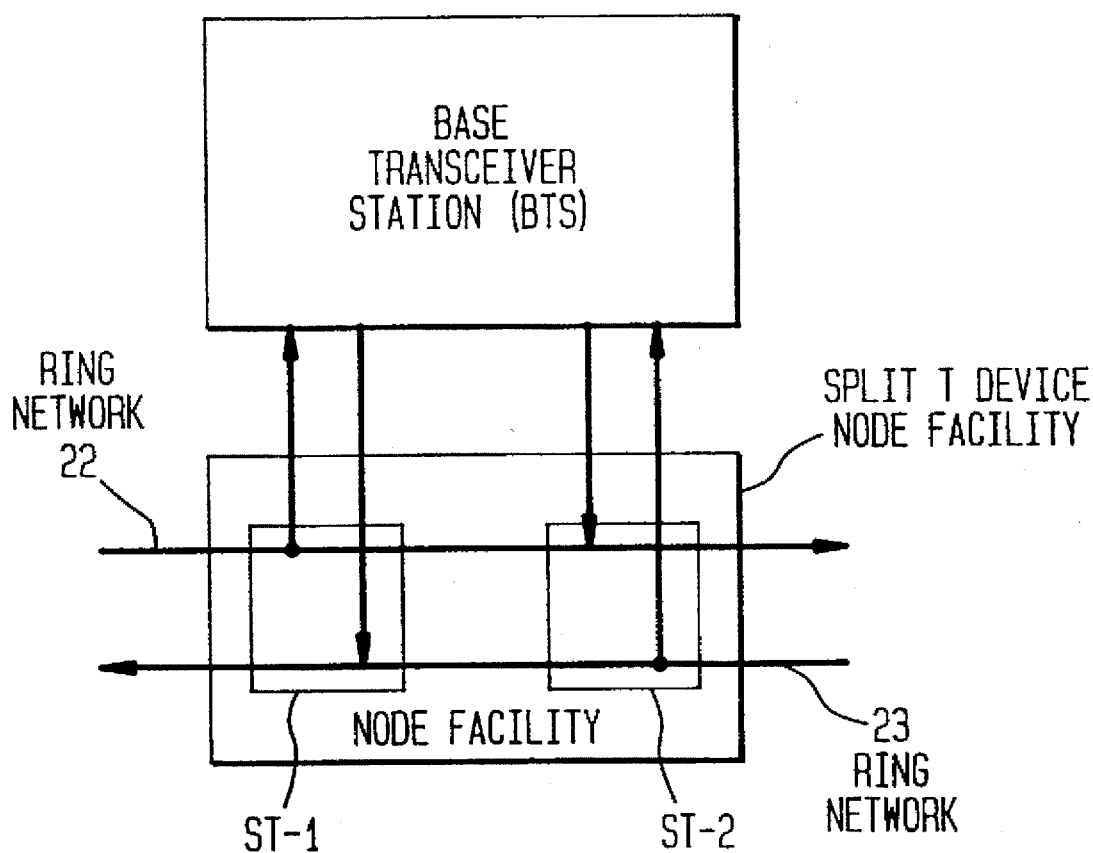
FIG. 4 is a block diagram of a node facility embodied as a split-T device according to the present invention.

FIG. 4 shows a block diagram of a node facility NF and signal flow when a split-T device is used at the node facility. As shown in FIG. 4, node facility NF includes split-Ts ST-1 and ST-2 which are both connected to the BTS of FIG. 4 and to ring circuits 22 and 23. Ring circuit 22 is shown having a communication information signal stream flowing to the right of FIG. 4, while the signal stream flow for ring circuit 23 is to the left. Communication information signals on ring circuit 22 directed to the BTS will be dropped to the BTS by split-T ST-1. Communication information signals inserted into the signal stream of ring 22 are inserted by split-T ST-2. Drop/insertion of communication information signals from/ into the signal stream of ring circuit 23 are done by split-T TS-2 and split-T TS-1, respectively. Communication information signals designated for a BTS other than the BTS shown in FIG. 4 will be passed through the node facility NF by split-Ts ST-1 and ST-2.

Figure 5:
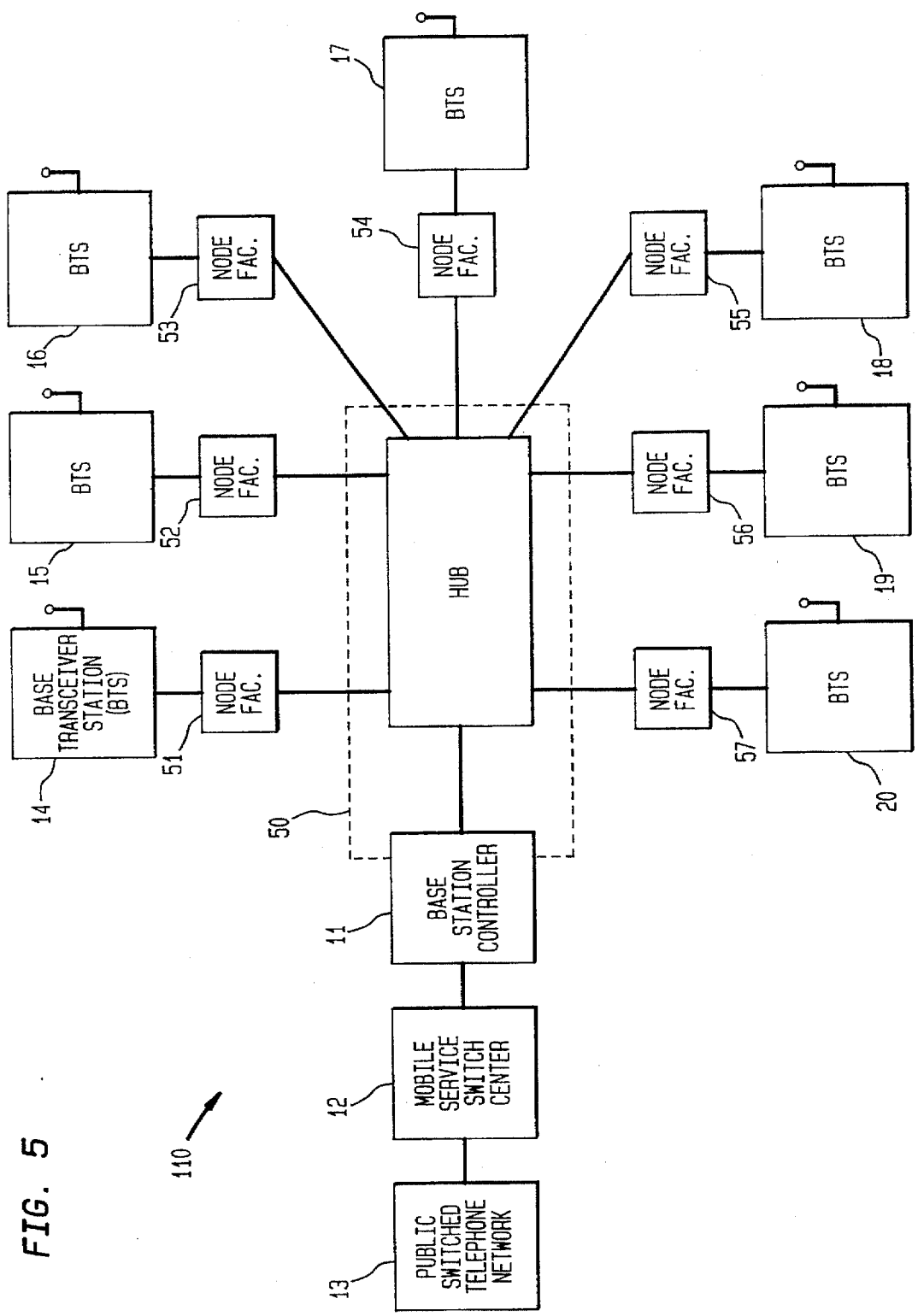
FIG. 5 is a generalized schematic block diagram for a star network system for a personal communication network having dynamic channel assignment capability according to the present invention.

FIG. 5 shows a PCN distribution system 110 configured as a star network having dynamic channel assignment capability according to the present invention. As with system 10, base station controller 11 is connected to MSC 12, which in turn is connected to PSTN 13. Base station controller 11 is connected to hub 50. The dashed line through BSC 11 and around hub 50 indicates that both BSC 11 and hub 50 can be physically located at the same site or can be located remotely from each other.

Each of BTSs 14–20 are connected to the hub 50 of star network system 110 through node facilities (NF) 51–57, respectively. Dynamic channel assignment for star network system 110 can be based on call activity or time of day principles, or a combination of both. It should be noted, though, that the restoration capability and reliability of star network system 110 is not as robust as that of ring network system 10.

Figure 6:
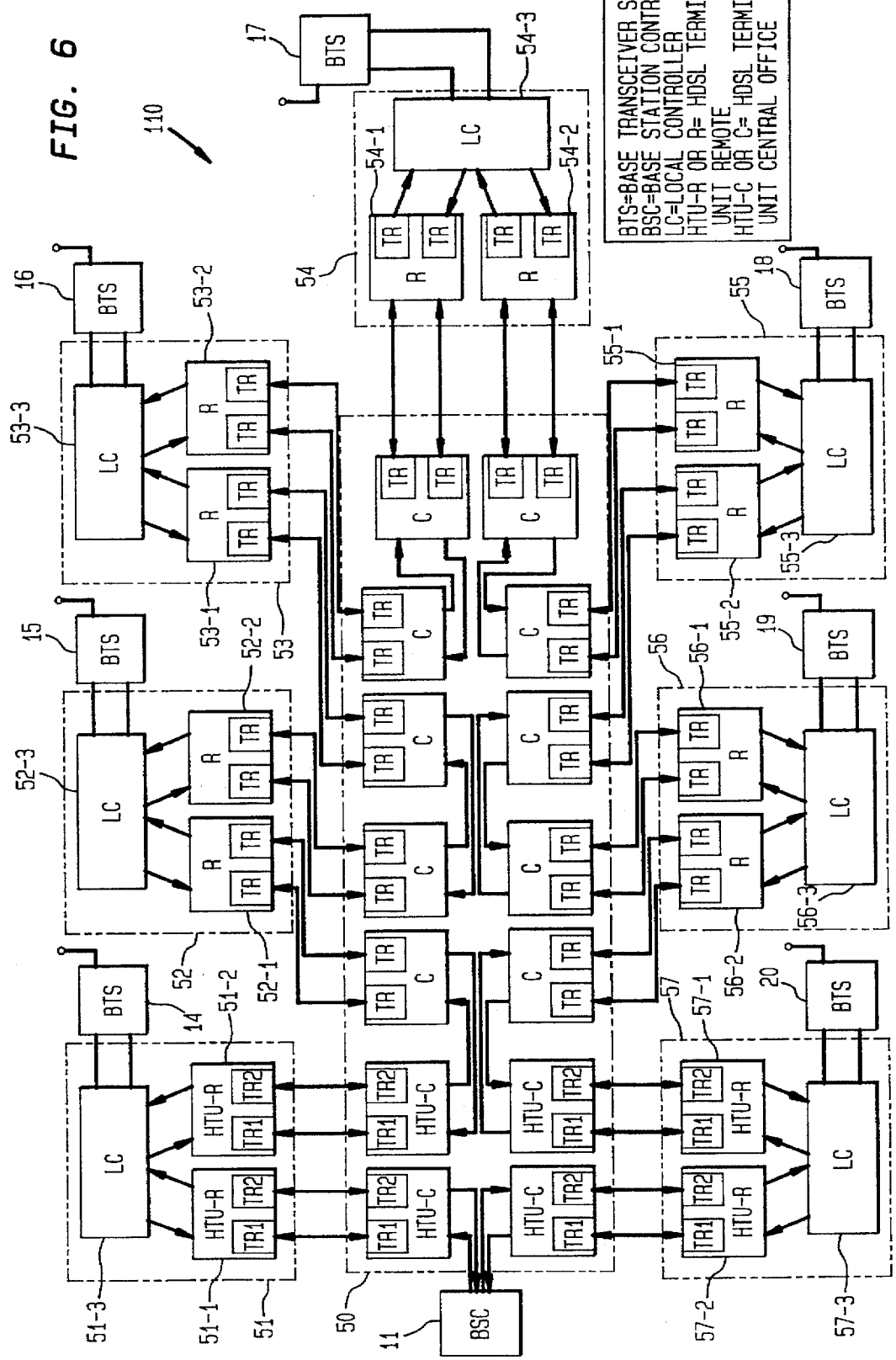
FIG. 6 is a detailed schematic block diagram of a star network system according to the present invention.

FIG. 6 shows star network 110 configured for use with HDSL devices. Each BTS in FIG. 6 is connected to hub 50 through two HTU-R devices and a local controller LC. Hub 50 includes two HTU-C devices for each node facility 51–57. The HTU devices and the local controllers of FIG. 6 operate in the same manner as the HTU devices and local controllers of FIG. 3.

While the present invention has been described in connection with the illustrated embodiments, it will be appreciated and understood that modifications may be made without departing from the true spirit and scope of the invention.

What is claimed is:

1. A method for dynamically allocating a plurality of time division multiplexed channels of a digital signal in a wired ring communications network having a base station controller and a predetermined number of node devices receiving and inserting digital communication information across the network, comprising the base station controller performing the steps of:

(1) communicating over the wired ring communications network with the node devices via the plurality of time division multiplexed channels of the digital signal;

(2) assigning each respective node device a first number of the plurality of time division multiplexed channels of the digital signal;

(3) allocating a second number of the plurality of time division multiplexed channels of the digital signal as floating channels; and (4) allocating dynamically said floating channels to the respective node devices according to an allocation scheme.

2. The method of claim 1, wherein said step (4) comprises the step of determining whether said allocating dynamically of said floating channels is required.

3. The method of claim 1, wherein said allocation scheme includes at least one criterion from the following group of criteria:

(i) time of day;
   (ii) call activity;
   (iii) speech interpolation; and
   (iv) weighted combination of call activity and time of day.

4. The method of claim 1, wherein the digital signal is implemented as a T-1 signal.

5. A system for dynamically allocating a plurality of time division multiplexed channels of a digital signal, comprising:

a wired ring communications network;

a base station controller coupled to said wired ring communications network; and a predetermined number of node devices receiving and inserting digital communication information across said wired ring communications network, wherein said base station controller includes:

a communicating means for communicating with the node devices via the plurality of time division multiplexed channels of the digital signal;

an assigning means for assigning each respective node device a first number of the plurality of time division multiplexed channels of the digital signal;

first allocating means for allocating a second number of the plurality of time division multiplexed channels of the digital signal as floating channels; and second allocating means for allocating dynamically said floating channels to the respective node devices according to an allocation scheme.

6. The system of claim 5, wherein said second allocating means comprises means for determining whether said allocating dynamically of said floating channels according to an allocation scheme is required.

7. The system of claim 5, wherein said allocation scheme includes at least one criterion from the following group of criteria:

(i) time of day;
   (ii) call activity;
   (iii) speech interpolation; and
   (iv) weighted combination of call activity and time of day.

8. The system of claim 5, wherein the digital signal is implemented as a T-1 signal.

9. A method for dynamically allocating twenty-four time division multiplexed (TDM) channels of a T-1 signal in a wired ring communications network having a base station controller (BSC) and a predetermined number of base transceiver stations (BTSs) receiving and inserting digital communication information across the network, comprising the BSC performing the steps of:

(1) communicating with the BTSs via the twenty-four TDM channels of the T-1 signal over the wired ring communications network;

(2) assigning a first number of the twenty-four TDM channels of the T-1 signal to each of the respective BTSs;

(3) allocating a second number of the twenty-four TDM channels of the T-1 signal as floating channels; and (4) allocating dynamically said floating channels to the respective BTSs according to an allocation scheme.

10. The method of claim 9, wherein said allocation scheme includes at least one criterion from the following group of criteria:

(i) time of day;
   (ii) call activity;
   (iii) speech interpolation; and
   (iv) weighted combination of call activity and time of day.

* * * * *